UNITED STATES PATENT OFFICE.

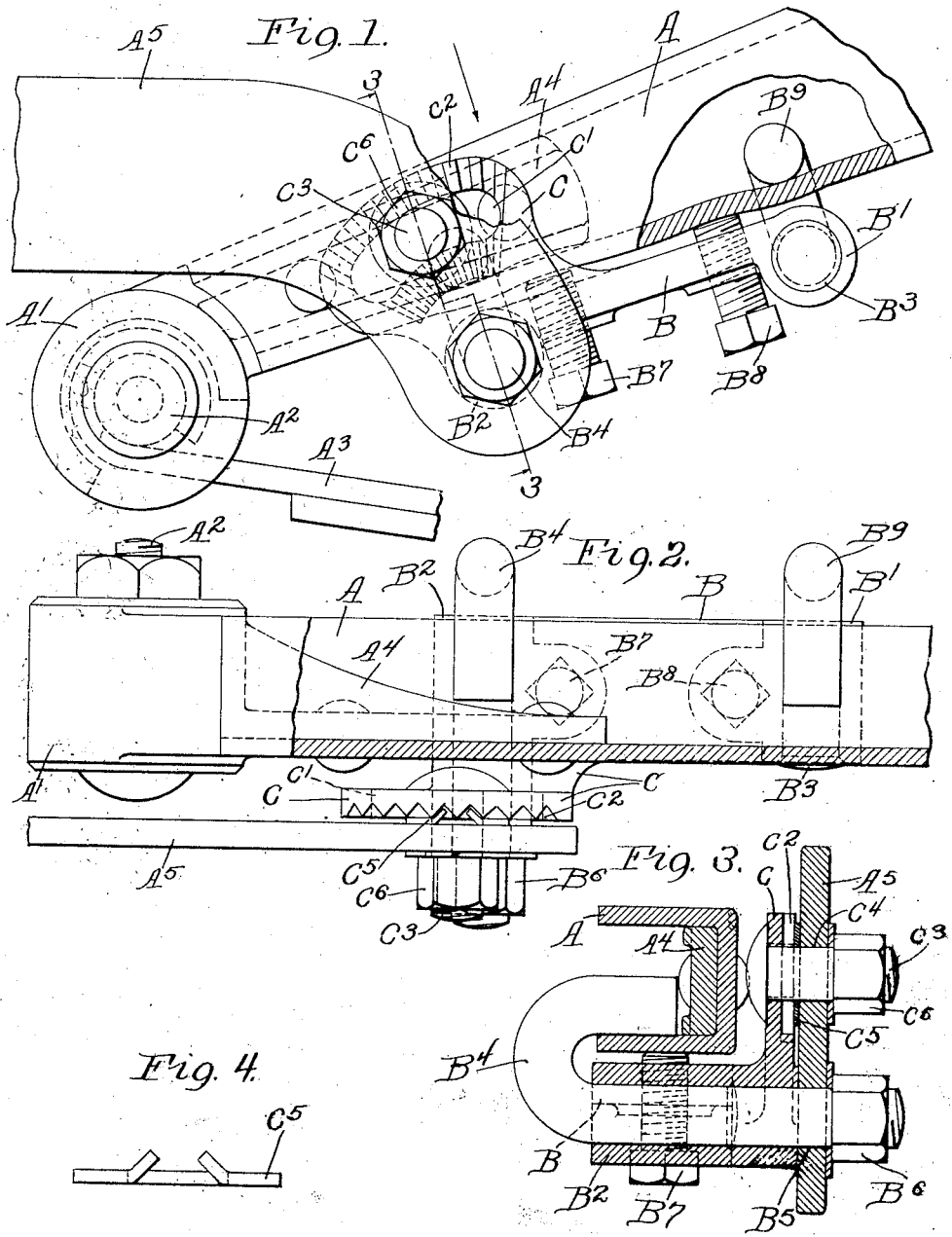

LEWIS P. HALLADAY, OF STREATOR, ILLINOIS.

AUTOMOBILE-BUMPER SUPPORT.

1,344,799.

Specification of Letters Patent.   Patented June 29, 1920.

Application filed February 16, 1920.  Serial No. 358,951.

*To all whom it may concern:*

Be it known that I, LEWIS P. HALLADAY, a citizen of the United States, residing at Streator, in the county of La Salle and State of Illinois, have invented a certain new and useful Improvement in Automobile-Bumper Supports, of which the following is a specification.

My invention relates to improvements in automobile bumper supports and has for one object to provide a new and improved form of support or bracket which will rigidly hold its position on the forward end of the automobile frame and which will make it possible to adjustably mount the bumper at the desired height or elevation independent of the frame shape. Another object is to provide a single bracket or support which will by its own unaided self support the bumper and which is so arranged and disposed as to leave the frame as free for the application of snubbers or shock absorbers or rebound springs and the like as if the bumper support were not there at all. Another object is to provide a clamp which will hold the lower flange of an automobile frame so rigidly that the frame itself may be destroyed without releasing the hold of the support. Other objects will appear from time to time in the specification.

My invention is illustrated more or less diagrammatically in the accompanying drawings wherein:

Figure 1 is a side elevation with parts in section and parts broken away; with frame partly in section;

Fig. 2 is a plan view looking in the direction of the arrow in Fig. 1;

Fig. 3 is a section along the broken line 3 3 of Fig. 1;

Fig. 4 is a side elevation of the lock washer.

Like parts are indicated by like characters in all the drawings.

A is the forward horn of the usual type of automobile frame terminating at its front end in a spring eye $A^1$ in which is a spring bolt $A^2$ carrying the normal automobile spring $A^3$. As shown, the spring eye is mounted on a part $A^4$ which is seated into and preferably welded in place in the forward end of the frame in accordance with the usual automobile frame construction practice. $A^5$ is one of the forwardly extending arms adapted to hold and support the ordinary type of bumper which may be rigid or spring or spring mounted, the particular details of which have nothing to do with my present invention.

B is a clamp body of substantially the same width as the automobile frame and adapted to underlie the frame. It has at either end, integral sleeves $B^1$ $B^2$. In the sleeve $B^1$ is a U shaped hook member $B^9$ preferably upset as indicated at $B^3$ but rotatable in the sleeve $B^1$ and adapted to rest on the upper surface of the lower flange of the automobile frame. $B^4$ is a hook bolt having a U shaped hook end. This bolt is located in the sleeve $B^2$ and overlies the upper surface of the lower flange of the automobile frame and passes through a perforation $B^5$ in the downwardly bent end of the bumper supporting bar. The nut $B^6$ is adapted to be tightened up to hold the parts together and prevent rattling and play. $B^7$ $B^8$ are set screws screw threaded in the member B and adapted respectively to engage the undersurface of the lower flange of the frame adjacent the hook bolts $B^4$ $B^9$. I have shown that the tightening up of these set screws and the resultant downward pull on the members $B^2$ $B^4$ actually deforms the frame flange itself and thus when they have been tightened up in order to displace the clamp on the frame, it is necessary to actually bend back the frame itself, that is to say, in whichever direction you move, you have to climb up hill with one or the other of the holding clamps. Obviously, as long as this grip is held the device cannot be detached without completely destroying the fabric of the frame.

C is a lug extending outwardly and then upwardly from the body B along side of but out of contact with the automobile frame. This lug has a curved slot $C^1$ concentric with the sleeve $B^2$ and the outer surface of this lug is serrated or corrugated as at $C^2$. $C^3$ is a holding bolt passing through the curved slot $C^1$ and through the aperture $C^4$ in the bar $A^5$. $C^5$ is a lock washer surrounding the bolt $C^3$ having its two ends upwardly turned to engage the serrations $C^2$ in the face of the lug. The tightening up of the nut $C^6$ locks the lug and bar together with the lock washer between them engaging the serrations. Since the washer fits tightly on the bolt C³ and since that bolt fits tightly in the bar A⁵, clearly rotary movement in the bar about the bolt B⁵ is prevented by the engagement of the washer and the serrated surface.

It will be evident that while I have shown in my drawings an operative device, still many changes might be made in size, shape, and arrangement of parts without departing materially from the spirit of my invention and I wish therefore, that my drawings be regarded as in a sense diagrammatic.

The use and operation of my invention are as follows:

The parts of the apparatus as I have shown it, may or may not come in assembled condition. In any event it is preferable to have the rearmost hook upset so as to maintain its place in the assembly. The operator will so manipulate the devices that the rearmost hook may be passed up between the splash apron and the lower flange of the frame so that the hook engages the flange. He can do the same with the forward hook preferably about that time, passing it through the forward sleeve. The set screws will be more or less tightened up so as to hold the parts loosely in position. The clamp will be positioned on the frame at the desired point and the set screws may be tightened up slightly. The bumper bar will then be pivoted on the forward hook. The other holding bolt with its associated washer will be passed through the flange and the bar. The bumper will then be rotated until its proper height or position is revealed and the nuts and set screws will then be tightened locking the parts rigidly in position. By this, the parts will be held in position until the set screws and nuts are actually unscrewed to release.

Claims:

1. A holding clamp comprising a body on one side of the part to be clamped, spaced hook members movably mounted thereon and adapted to overhang and engage the part to be clamped, clamping members mounted on the body and engaging the part to be clamped in opposition to the hook members.

2. A holding clamp comprising a body on one side of the part to be clamped, spaced hook members mounted thereon and adapted to overhang and engage the part to be clamped, clamping members mounted on the body and engaging the part to be clamped in opposition to the hook members, the hooks and clamping members being out of line one with the other so that their clamping pressure tends to bend the part which is clamped.

3. A holding clamp comprising a body on one side of the part to be clamped, spaced hook members mounted thereon and adapted to overhang and engage the part to be clamped, clamping members mounted on the body and engaging the part to be clamped in opposition to the hook members, the hook members being pivoted in the body but held against longitudinal movement with respect thereto.

4. A holding clamp comprising a body on one side of the part to be clamped, spaced hook members mounted thereon and adapted to overhang and engage the part to be clamped, clamping members mounted on the body and engaging the part to be clamped in opposition to the hook members, a lug extending outwardly and upwardly from the body and adapted to lie along side of an automobile frame when the part which is clamped is one of the frame flanges and a bumper supporting bar pivoted on the body and adjustably supported on the lug.

5. A holding clamp comprising a body on one side of the part to be clamped, spaced hook members mounted thereon and adapted to overhang and engage the part to be clamped, clamping members mounted on the body and engaging the part to be clamped in opposition to the hook members, the hooks and clamping members being out of line one with the other so that their clamping pressure tends to bend the part which is clamped, a lug extending outwardly and upwardly from the body and adapted to lie along side of an automobile frame when the part which is clamped is one of the frame flanges, and a bumper supporting bar pivoted on the body and adjustably supported on the lug.

6. A holding clamp comprising a body on one side of the part to be clamped, spaced hook members mounted thereon and adapted to overhang and engage the part to be clamped, clamping members mounted on the body and engaging the part to be clamped in opposition to the hook members, the hook members being pivoted in the body but held against longitudinal movement with respect thereto, a lug extending outwardly and upwardly from the body and adapted to lie along side of an automobile frame when the part which is clamped is one of the frame flanges, and a bumper supporting bar pivoted on the body and adjustably supported on the lug.

7. A holding clamp comprising a body on one side of the part to be clamped, spaced hook members mounted thereon and adapted to overhang and engage the part to be clamped, clamping members mounted on the body and engaging the part to be clamped in opposition to the hook members, a lug extending outwardly and upwardly from the body and adapted to lie along side of an automobile frame when the part which is clamped is one of the frame flanges and a bumper supporting bar pivoted on the body and adjustably supported on the lug, the lug having a slot concentric with the pivot point of the bar, means extending through the slot and the bar for holding the bar against the lug.

8. A holding clamp comprising a body on one side of the part to be clamped, spaced hook members mounted thereon and adapted to overhang and engage the part to be clamped, clamping members mounted on the body and engaging the part to be clamped in opposition to the hook members, the hooks and clamping members being out of line one with the other so that their clamping pressure tends to bend the part which is clamped a lug extending outwardly and upwardly from the body and adapted to lie along side of an automobile frame when the part which is clamped is one of the frame flanges, and a bumper supporting bar pivoted on the body and adjustably supported on the lug, the lug having a slot concentric with the pivot point of the bar, means extending through the slot and the bar for holding the bar against the lug.

9. A holding clamp comprising a body on one side of the part to be clamped, spaced hook members mounted thereon and adapted to overhang and engage the part to be clamped, clamping members mounted on the body and engaging the part to be clamped in opposition to the hook members, the hook members being pivoted in the body but held against longitudinal movement with respect thereto, a lug extending outwardly and upwardly from the body and adapted to lie along side of an automobile frame when the part which is clamped is one of the frame flanges, and a bumper supporting bar pivoted on the body and adjustably supported on the lug, the lug having a slot concentric with the pivot point of the bar, means extending through the slot and the bar for holding the bar against the lug.

10. A holding clamp comprising a body on one side of the part to be clamped, spaced hook members mounted thereon and adapted to overhang and engage the part to be clamped, clamping members mounted on the body and engaging the part to be clamped in opposition to the hook members, a lug extending outwardly and upwardly from the body and adapted to lie along side of an automobile frame when the part which is clamped is one of the frame flanges, and a bumper supporting bar pivoted on the body and adjustably supported on the lug, the lug having a slot concentric with the pivot point of the bar, means extending through the slot and the bar for holding the bar against the lug, the face of the lug opposed to the bar being serrated, means associated with the bolt and between the serrated face of the lug and the bar for engaging said serrations and positively holding the bar against movement.

11. A holding clamp comprising a body on one side of the part to be clamped, spaced hook members mounted thereon and adapted to overhang and engage the part to be clamped, clamping members mounted on the body and engaging the part to be clamped in opposition to the hook members, the hooks and clamping members being out of line one with the other so that their clamping pressure tends to bend the part which is clamped, a lug extending outwardly and upwardly from the body and adapted to lie along side of an automobile frame when the part which is clamped is one of the frame flanges, and a bumper supporting bar pivoted on the body and adjustably supported on the lug, the lug having a slot concentric with the pivot point of the bar, means extending through the slot and the bar for holding the bar against the lug, the face of the lug opposed to the bar being serrated, means associated with the bolt and between the serrated face of the lug and the bar for engaging said serrations and positively holding the bar against movement.

12. A holding clamp comprising a body on one side of the part to be clamped, spaced hook members mounted thereon and adapted to overhang and engage the part to be clamped, clamping members mounted on the body and engaging the part to be clamped in opposition to the hook members, the hook members being pivoted in the body but held against longitudinal movement with respect thereto, a lug extending outwardly and upwardly from the body and adapted to lie along side of an automobile frame when the part which is clamped is one of the frame flanges, and a bumper supporting bar pivoted on the body and adjustably supported on the lug, the lug having a slot concentric with the pivot point of the bar, means extending through the slot and the bar for holding the bar against the lug, the face of the lug opposed to the bar being serrated, means associated with the bolt and between the serrated face of the lug and the bar for engaging said serrations and positively holding the bar against movement.

13. A holding clamp comprising a body on one side of the part to be clamped, spaced hook members mounted thereon and adapted to overhang and engage the part to be clamped, clamping members mounted on the body and engaging the part to be clamped in opposition to the hook members, the hook members being pivoted in the body but held against longitudinal movement with respect thereto, a bumper bar pivoted on one of said hooks, said hook having a screw threaded shank, a nut screw threaded thereon adapted to seat the bumper bar against the body.

14. A holding clamp comprising a body on one side of the part to be clamped, spaced hook members mounted thereon and adapted to overhang and engage the part to be clamped, clamping members mounted on the body and engaging the part to be clamped in opposition to the hook members, the hook members being pivoted in the body but held against longitudinal movement with respect thereto, a bumper bar pivoted on one of said hooks, said hook having a screw threaded shank, a nut screw threaded thereon adapted to seat the bumper bar against the body, and means independent of said hook for holding the bumper bar against rotation about its pivot.

15. A holding clamp comprising a body on one side of the part to be clamped, spaced hook members mounted thereon and adapted to overhang and engage the part to be clamped, clamping members mounted on the body and engaging the part to be clamped in opposition to the hook members, the hook members being pivoted in the body but held against longitudinal movement with respect thereto, a bumper bar pivoted on one of said hooks, said hook having a screw threaded shank, a nut screw threaded thereon adapted to seat the bumper bar against the body, and means independent of said hook for holding the bumper bar against rotation about its pivot, said means comprising a lug projecting from the body, a curved slot therein and a bolt passing through the bar and slot adapted to hold the lug and bar together.

16. A holding clamp comprising a body on one side of the part to be clamped, spaced hook members mounted thereon and adapted to overhang and engage the part to be clamped, clamping members mounted on the body and engaging the part to be clamped in opposition to the hook members, the hook members being pivoted in the body but held against longitudinal movement with respect thereto, a bumper bar pivoted on one of said hooks, said hook having a screw threaded shank, a nut screw threaded thereon adapted to seat the bumper bar against the body, and means independent of said hook for holding the bumper bar against rotation about its pivot, said means comprising a lug projecting from the body, a curved slot therein and a bolt passing through the bar and slot adapted to hold the lug and bar together, the face of the lug being serrated and a member associated with the bolt and clamp between the bar and serrated surface for engaging the serrations to give a positive locking action.

17. A holding clamp comprising a body, integral sleeves at either end thereon, hooks pivoted in said sleeves and overlying the body and adapted to engage the part to be clamped, set screws screw-threaded in the body adjacent but out of line with said hooks and adapted to engage the opposed sides of the part to be clamped.

18. A holding clamp comprising a body, integral sleeves at either end thereon, hooks pivoted in said sleeves and overlying the body and adapted to engage the part to be clamped, set screws screw-threaded in the body adjacent but out of line with said hooks and adapted to engage the opposed sides of the part to be clamped, a lug extending outwardly and upwardly from the body and adapted to lie along side of an automobile frame when the part which is clamped is one of the frame flanges, and a bumper supporting bar pivoted on the body and adjustably supported on the lug.

19. A holding clamp comprising a body, integral sleeves at either end thereon, hooks pivoted in said sleeves and overlying the body and adapted to engage the part to be clamped, set screws screw-threaded in the body adjacent but out of line with said hooks and adapted to engage the opposed sides of the part to be clamped, a lug extending outwardly and upwardly from the body and adapted to lie along side of an automobile frame when the part which is clamped is one of the frame flanges and a bumper supporting bar pivoted on the body and adjustably supported on the lug, the lug having a slot concentric with the pivot point of the bar, means extending through the slot and the bar for holding the bar against the lug.

20. A holding clamp comprising a body, integral sleeves at either end thereon, hooks pivoted in said sleeves and overlying the body and adapted to engage the part to be clamped, set screws screw-threaded in the body adjacent but out of line with said hooks and adapted to engage the opposed sides of the part to be clamped, a lug extending outwardly and upwardly from the body and adapted to lie along side of an automobile frame when the part which is clamped is one of the frame flanges, and a bumper supporting bar pivoted on the body and adjustably supported on the lug, the lug having a slot concentric with the pivot point of the bar, means extending through the slot and the bar for holding the bar against the lug, the face of the lug opposed to the bar being serrated, means associated with the bolt and between the serrated face of the lug and the bar for engaging said serrations and positively holding the bar against movement.

21. A clamp for automobile bumpers and the like comprising a laterally disposed body adapted to underlie an automobile frame, a lug projecting outwardly and upwardly therefrom along side of but out of contact with the side of the frame, a pair of U shaped hooks mounted on the body adapted to surround and engage the upper surface of the lower frame flange, set screws mounted in the body one adjacent each of said hooks adapted to engage the under surfaces of the lower frame flange, a bumper bar pivoted on one of them the lug having a slot concentric with such pivot, the surface of the lug adjacent the slot serrated, a bolt passing through the slot and bumper bar and a member carried by the bolt interposed between the bar and lug and having teeth adapted to engage the serrations on the lug.

Signed at Chicago, county of Cook and State of Illinois, this third day of February, 1920.

LEWIS P. HALLADAY.